United States Patent Office 3,028,350
Patented Apr. 3, 1962

3,028,350
WATER-EMULSION POLISH COMPOSITION
Arthur G. Hirsch, Dyer, Ind., assignor to Standard Oil Company, Chicago, Ill., a corporation of Indiana
No Drawing. Filed Nov. 18, 1959, Ser. No. 853,713
7 Claims. (Cl. 260—28)

This invention relates to wax-type polishes and particularly to water emulsion polish compositions.

Today, wax protective coatings for surfaces such as wood flooring, asphalt tile, and the like, are frequently applied in the form of a dispersion of wax particles in water. In the art these water compositions are referred to as water emulsion polishes. Water emulsion polishes containing only wax, emulsifier and water tend to have poor leveling properties, only fair gloss. Mixtures of wax and other compounds, particularly shellac, have been introduced in order to provide better spreading and leveling characteristics along with better gloss. The shellac containing water emulsion polishes have the disability of inferior color and after prolonged standing are very difficult to remove from the coated surface.

An object of the invention is a water emulsion polish composition affording leveling and gloss characteristics better than ordinary wax water emulsion polishes. Another object is a water emulsion polish providing excellent leveling and spreading and other characteristics of the surface coating. A particular object is a water emulsion polish whose color is as good or better than ordinary wax water emulsion polish. A further object is a water emulsion polish of good water resistance and with good removability characteristics with respect to soapy water washing. Yet another object is a water emulsion polish composition affording only a moderate amount of slipperiness in the surface coating obtained therefrom. Other objects will become apparent in the course of the detailed description of the invention.

The water emulsion polish composition of the invention consists essentially of wax, solid resin, emulsifier and water. The wax and the resin are present in the composition in a weight ratio of wax:resin from about 90:10 to about 20:80. The composition itself has a pH of at least 7. The solid resin utilized in the composition of the invention is the condensation reaction product of trimellitic anhydride and alkylene oxide having 2–4 carbon atoms and the resin is characterized by an Acid No. from at least about 30 to about 170.

The resin component of the invention is prepared by reacting trimellitic anhydride and an alkylene oxide having 2–4 carbon atoms, in desired proportions in the presence of an alkaline catalyst at a temperature between about 20° C. and about 200° C. It is preferred to employ a reaction temperature below about 120° C. in order to avoid cross-linking and gelling. As catalysts there may be employed inorganic or organic bases such as alkali metal hydroxide, calcium oxide, sodium amide, secondary amines such as diethylamine, dibutylamine, piperidine and the like and tertiary amines such as trimethylamine, triethanolamine, pyridine and the like. Amines are preferred and are used usually in an amount of about 0.1% to about 5% based on the weight of trimellitic anhydride. Suitably, the reaction is effected during a period of 2–24 hours, more commonly 2–8 hours.

Although, ethylene oxide, propylene oxide and the various butylene oxides are all suitable reactants in the preparation of the resin, propylene oxide is the preferred oxide reactant.

The trimellitic anhydride and alkylene oxide are reacted in proportions such that the solid resin product has an Acid No. (mg. of KOH per gram of resin) from at least about 30 to about 170. Solid resin having an Acid No. from about 50 to about 90 is particularly preferred for the preparation of superior quality surface coatings. The solid resin is readily taken into water solution by reaction with aqueous ammonium hydroxide or aqueous solution of a lower molecular weight aliphatic amine. Particularly suitable amines are morpholine and monoethanolamine.

It has been discovered that much better surface coatings are obtained by the use of a mixture of the defined solid resin and of wax. The weight ratio of wax:resin in the final polish composition is from about 90:10 to about 20:80. Particularly good results are obtained when the weight ratio is from about 80:20 to about 60:40.

The wax component is any one that is ordinarily used on floor coverings such as wood and asphalt tile and other materials wherein water emulsion polishes are suitable and may be a vegetable wax, a mineral wax, an oxidized mineral wax and mixtures of two or more of these waxes. Outstandingly good properties are obtained when the wax component is carnauba wax.

It is necessary to provide an emulsifier to maintain a stable dispersion of the wax in the water emulsion polish composition. These emulsifiers may be any of those commonly used in the preparation of these compositions, such as ammonia, borax, ethanol, amine, morpholine, sodium oleate, and other fatty acid reaction products with amines or alkanolamines.

The "solids" content of the water emulsion polish composition of the invention is stated hereinafter as the sum total of the wax present and solid resin present and is generally from about 6 to about 18 percent per weight of the compsition. More usually, the total of the wax and resin present is from about 9 to about 15 weight percent of the composition.

Sufficient emulsifier is present to afford a storage stable composition. For example, the composition may contain between about 1–3 weight percent of an emulsifier such as morpholine oleate.

The wax, resin, emulsifier and alkaline affording material are not the only materials which may be present, in addition to the water. Other materials may be added to improve gloss or to reduce slipperiness, etc. Thus the composition contains the defined wax, the defined solid resin, emulsifier, alkaline affording material and the remainder essentially water.

In order to afford storage stability of the water emulsion polish composition, the invention is adjusted to a pH of at least 7 and more usually to a pH from about 7.5 to about 10.

The final water emulsion polish composition of the invention is normally prepared by making a water emulsion of the wax portion and a water solution of the resin portion, separately, and then mixing the two to provide the final composition. It is possible to prepare the final composition by utilizing aqueous resin solution in connection with the preparation of the water emulsion of the wax component and then diluting, if necessary, to the final desired water content.

RESIN ILLUSTRATIONS

Two solid resins suitable for use in the invention are illustrated in the method of preparation and the final resin characteristics hereinbelow. In the illustrative resins the reactants were trimellitic anhydride and propylene oxide. In each preparation the catalyst was pyridine and was used in an amount of 0.5 ml.

The reaction vessel was a three-necked flask provided with a stirrer, a condenser and a thermometer. The reactants were at room temperature before addition to the flask. The condensation reaction is exothermic and the temperature of the contents of the flask rose over a period of about two hours to about 50° C. The reaction product in the flask became very viscous after about two hours. The reaction was continued until the Acid No. became essentially constant; in these instances, in about 8–24 hours. These materials were so viscous that they can be considered as solids.

lightly with a soft bristle brush. Good indicates complete removal of the film on rinsing with 120° F. tap water.

The results of the testing of the four compositions are set out in the annexed table.

TABLE

| Composition | Leveling and Spreading | Gloss | Hardness (1 is hardest) | Slip Resis'ce (1—least slippery) | Water Resis'ce (1 hr.) | Removability |
|---|---|---|---|---|---|---|
| 100% Wax Base | Poor | Fair | 4 | 2 | Good | Fair. |
| 80% Wax Base + 20% Shellac | Excellent | Good | 2 | 3 | Good | Good. |
| 80% Wax Base + 20% A sol'n | Fair | Good | 1 | 3 | Fair | Good. |
| 80% Wax Base + 20% B sol'n | Excellent | Good | 3 | 1 | Good | Good. |

*Resin A*

Resin A was prepared by reacting 0.5 mole of the anhydride and 1.0 mole of the oxide. The product resin had molecular weight of 1040. The Hydroxyl Number was 85 (mg. KOH to neutralize the acetic acid released from one gram of acetylated sample). The Acid No. was 168.

*Resin B*

Resin B was prepared by reacting 0.5 mole of the anhydride with 1.25 moles of the oxide. The resin product had a molecular weight of 2100. The Hydroxyl No. was 132. The Acid No. was 74.

ILLUSTRATIVE POLISH COMPOSITIONS

Illustrative polish compositions were made by utilizing as the wax affording component a commercial wax emulsion containing 12 percent of wax solids which were a mixture of carnauba wax and high melting paraffin wax. This wax base contained an ethanolamine emulsifier.

Twelve percent solutions of resins A and B, respectively, were prepared by stirring each solid in ammonia water at about 70–80° C. until a solution was obtained having a pH of 9. The water solutions of resins A and B, respectively, were cooled to room temperature.

Shellac "solution" containing 12 percent of shellac solids was also prepared according to known procedures.

Four water emulsion polish compositions were made available for the coating of asphalt tiles. Composition one was the commercial water emulsion wax polish—hereinafter spoken of as the wax base. Composition two consisted of a mixture of 80 weight percent of the wax base and 20 percent of the shellac solution. Composition three consisted of 80 percent of wax base and 20 percent of resin A solution. Composition four consisted of 80 percent of the wax base and 20 percent of resin B solution.

These four compositions were applied under regular test procedures to asphalt tiles and the following observations made on the coating as it was being applied and on the coating after it had dried; the ability of the coating to spread out and to avoid patches of different thickness and leveling was observed as the coating was put on the tile. The gloss of the coating was determined as dried without buffing. The hardness of the coating was determined by relative tests ranging from 1 to 4 wherein a rating of one was the hardest observed coating. The resistance of the coating to slipperiness is also determined by relative tests wherein a rating of one indicates the least degree of slipperiness.

Water resistance checks consisted of placing 1 ml. of water on the finishes 24 hours after drying, allowing this to stand for one hour, wiping the panel dry, waiting one-half hour, and then buffing the panel lightly. Good indicates no water damage.

Removability checks were conducted by drying the finishes for 48 hours, soaking the panels in a water solution of 0.25% ammonium hydroxide (28%) and 0.25% Ivory soap flakes at 120° F. for five minutes and brushing The coating results show that the wax base-resin containing compositions are better than the wax base alone. The wax-resin B composition is at least as good as the wax base-shellac composition. The wax-resin composition coatings were noticeably lighter in color than the coatings from wax alone, or from the wax-shellac polish.

The color of the resin solutions and the shellac solutions were further compared. Strips of filter paper soaked in the 12% resin solutions and then dried showed tremendous superiority in color over shellac strips. The resins films dried to a slight off-white color, whereas the shellac dried to a yellow color. Colors of the 12% resin solutions indicate this difference:

Gardner (1933) color
12% solution of resin A _____ 0–1
12% solution of Resin B _____ 1
12% solution of shellac _____ 13–14

Thus having describing the invention what is claimed:

1. A water-emulsion polish composition consisting essentially of wax, a solid resin, emulsifier and water, said wax and said resin being present in a weight ratio from about 90:10 to about 20:80 and where said resin is the condensation reaction product of trimellitic anhydride and alkylene oxide having 2–4 carbon atoms and is characterized by an Acid No. from at least about 30 to about 170, said polish having a pH of at least 7.

2. The polish of claim 1 wherein said wax and said resin total from about 6 to about 18 weight percent of said composition.

3. The polish of claim 1 wherein said oxide is propylene oxide.

4. The polish of claim 1 wherein said resin has an Acid No. from about 50 to about 90.

5. The polish of claim 1 wherein said ratio is from about 80:20 to about 60:40.

6. The polish of claim 1 wherein said wax is carnauba wax.

7. A water-emulsion polish composition consisting of a wax selected from the group consisting of vegetable wax, mineral wax, oxidized mineral wax and mixtures thereof, solid resin product of the condensation reaction of trimellitic anhydride and propylene oxide which resin is characterized by an Acid No. from about 50 to about 90, said wax and said resin being present in a weight ratio from about 80:20 to about 60:40 and in a total of from about 9 to about 15 weight percent of said composition, emulsifier alkalizing agent to provide a composition pH from about 7.5 to about 10 and the remainder essentially water.

References Cited in the file of this patent

UNITED STATES PATENTS 2,483,701    Hawley et al. _____ Oct. 4, 1949